United States Patent
Tosaki et al.

(10) Patent No.: US 6,939,911 B2
(45) Date of Patent: Sep. 6, 2005

(54) PRESSURE-SENSITIVE ADHESIVE COMPOSITION AND PRESSURE-SENSITIVE ADHESIVE PRODUCT

(75) Inventors: Yutaka Tosaki, Ibaraki (JP); Hiroaki Kishioka, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 7 days.

(21) Appl. No.: 10/871,372

(22) Filed: Jun. 21, 2004

(65) Prior Publication Data

US 2004/0260009 A1 Dec. 23, 2004

(30) Foreign Application Priority Data

Jun. 23, 2003 (JP) .................................. P. 2003-178393

(51) Int. Cl.[7] .................................................. C08J 3/00
(52) U.S. Cl. ...................................... 524/522; 524/523
(58) Field of Search ................................ 524/522, 523

(56) References Cited

U.S. PATENT DOCUMENTS

| | | | | |
|---|---|---|---|---|
| 5,225,470 A | * | 7/1993 | Mancinelli | .................. 524/271 |
| 6,448,339 B1 | | 9/2002 | Tomita | |
| 6,646,050 B2 | | 11/2003 | Ohrui et al. | |
| 6,657,011 B2 | * | 12/2003 | Lau et al. | .................. 525/221 |
| 6,720,375 B2 | * | 4/2004 | Suzuki et al. | ............... 524/349 |
| 2001/0041763 A1 | | 11/2001 | Suzuki et al. | |

FOREIGN PATENT DOCUMENTS

| | | | |
|---|---|---|---|
| EP | 304779 A2 | * | 3/1989 |
| EP | 0 467 641 A1 | | 1/1992 |
| EP | 0491169 A2 | * | 6/1992 |
| JP | 1-178567 A | | 7/1989 |
| JP | 08209095 A | * | 8/1996 |
| JP | 10-310754 A | | 11/1998 |
| JP | 2000-109771 A | | 4/2000 |
| JP | 2001-89731 A | | 4/2001 |
| JP | 2001-335767 A | | 12/2001 |
| JP | 2002-30264 A | | 1/2002 |
| JP | 2002-327160 A | | 11/2002 |
| JP | 2003-49143 A | | 2/2003 |

OTHER PUBLICATIONS

European Search Report dated Oct. 27, 2004.

* cited by examiner

*Primary Examiner*—Bernard Lipman
(74) *Attorney, Agent, or Firm*—Sughrue Mion, PLLC

(57) ABSTRACT

A pressure-sensitive adhesive composition contains (a) an acrylic polymer containing an alkyl (meth)acrylate whose alkyl group has from 4 to 12 carbon atoms, as a monomer major component and from 1 to 10 parts by weight, based on 100 parts by weight of the whole of the monomer components, of a carboxyl group-containing monomer as a monomer component and having a weight average molecular weight of from 500,000 to 900,000; and (b) an oligomer containing an ethylenically unsaturated monomer, in which a homopolymer formed therefrom has a glass transition temperature of from 60 to 190° C. and which has a cyclic structure, as a monomer major component and from 1 to 10 parts by weight, based on 100 parts by weight of the whole of the monomer components, of a carboxyl group-containing monomer as a monomer component and having a weight average molecular weight of from 3,000 to 6,000.

5 Claims, No Drawings

PRESSURE-SENSITIVE ADHESIVE COMPOSITION AND PRESSURE-SENSITIVE ADHESIVE PRODUCT

FIELD OF THE INVENTION

The present invention relates to a pressure-sensitive adhesive composition and a pressure-sensitive adhesive product. In particular, the invention relates to a pressure-sensitive adhesive composition and a pressure-sensitive adhesive product having excellent transparency and lifting and peeling preventing properties.

BACKGROUND OF THE INVENTION

In recent years, there are a lot of applications in which an optical film is stuck and fixed onto a transparent plastic substrate (for example, polycarbonate-made substrates and acrylic resin-made substrates) as a substrate using a pressure-sensitive adhesive or a pressure-sensitive adhesive tape or sheet. In such applications, the pressure-sensitive adhesive or pressure-sensitive adhesive tape or sheet is required to have not only transparency such that visibility of a transparent plastic substrate or optical film is not hindered but also lifting and peeling preventing properties (resistance to foaming and peeling) such that after weathering tests under severe conditions such as high-temperature conditions and high-temperature and high-humidity conditions, lifting or peeling at the adhesion interface due to air bubbles (foams) generated from the plastic substrate or the like is not caused. Concretely, under high-temperature or high-temperature and high-humidity conditions, plastic substrates such as acrylic resin-made substrates and polycarbonate-made substrate may possibly cause outgassing that is a cause of foaming considered to be caused by the absorbed moisture or residual monomer. For this reason, if a weathering test is performed by sticking an optical film made of a base material film having barrier properties, such as polyethylene terephthalate (PET) films, on an acrylic resin-made substrate or polycarbonate-made substrate using a pressure-sensitive adhesive or pressure-sensitive adhesive tape or sheet, lifting or peeling occurs at the adhesion interface with the pressure-sensitive adhesive layer due to air bubbles (foams) generated from the substrate or the like, whereby not only the appearance lowers, but also the visibility is markedly hindered.

Thus, in these applications, there have hitherto been made attempts to prevent lifting or peeling from occurrence even if air bubbles are generated from an adherend such as substrates, by, for example, properly adjusting the molecular weight of an acrylic polymer as a base polymer of the pressure-sensitive adhesive, adding various additives for increasing adhesion to the plastic substrate, such as a tackifier, to the pressure-sensitive adhesive, or copolymerizing the polymer formulation of a base polymer of the pressure-sensitive adhesive with a monomer component capable of increasing adhesion (see Patent Documents 1 to 8).

[Patent Document 1]
JP-A-1-178567
[Patent Document 2]
JP-A-2002-30264
[Patent Document 3]
JP-A-2001-335767
[Patent Document 4]
JP-A-2001-89731
[Patent Document 5]
JP-A-2000-109771
[Patent Document 6]
JP-A-2003-49143
[Patent Document 7]
JP-A-2002-327160
[Patent Document 8]
JP-A-10-310754
(The term "JP-A" as used herein means an "unexamined published Japanese patent application")

However, in the method of properly adjusting the molecular weight of an acrylic polymer as a base polymer of the pressure-sensitive adhesive, there are limitations in improving the lifting and peeling preventing properties (resistance to foaming and peeling). Also, in the method of adding a tackifier to the pressure-sensitive adhesive, since if the compounding amount of the tackifier is large, transparency is hindered, the compounding amount is obviously limited. Accordingly, in this case, there are limitations in improving the lifting and peeling preventing properties, too. Further, with respect to the polymer formulation for increasing adhesion, its lifting and peeling preventing properties were limited so that high requirement levels could not be satisfied.

SUMMARY OF THE INVENTION

Accordingly, an object of the invention is to provide a pressure-sensitive adhesive composition and a pressure-sensitive adhesive product having excellent transparency and excellent lifting and peeling preventing properties.

Another object of the invention is to provide a pressure-sensitive adhesive composition and a pressure-sensitive adhesive product that even when used in sticking an optical film to a substrate, can prevent lifting and peeling from occurrence due to air bubbles generated from the substrate, enables one to perform adhering with excellent adhesiveness, and can keep excellent visibility of the optical film.

For the sake of achieving the foregoing objects, the present inventors made extensive and intensive investigations. As a result, it has been found that by sticking an optical film to a substrate using an acrylic pressure-sensitive adhesive composition obtained by combining a specific acrylic polymer with a specific oligomer, even when air bubbles are generated from the substrate or the like under severe conditions such as high-temperature conditions, lifting or peeling does not occur at the adhesion interface, and excellent visibility can be kept, leading to accomplishment of the invention based on this knowledge.

Specifically, the invention provides a pressure-sensitive adhesive composition containing (a) an acrylic polymer containing an alkyl (meth)acrylate, in which the alkyl group thereof has from 4 to 12 carbon atoms, as a monomer major component and from 1 to 10 parts by weight, based on 100 parts by weight of the whole of the monomer components, of a carboxyl group-containing monomer as a monomer component and having a weight average molecular weight of from 500,000 to 900,000; and (b) an oligomer containing an ethylenically unsaturated monomer, in which a homopolymer formed therefrom has a glass transition temperature of from 60 to 190° C. and which has a cyclic structure, as a monomer major component and from 1 to 10 parts by weight, based on 100 parts by weight of the whole of the monomer components, of a carboxyl group-containing monomer as a monomer component and having a weight average molecular weight of from 3,000 to 6,000.

In the foregoing pressure-sensitive adhesive composition, it is preferable that the proportion of the oligomer (b) is from 10 to 35 parts by weight based on 100 parts by weight of the acrylic polymer (a). Also, it is preferable that the carboxyl group-containing monomers as the monomer components in the acrylic polymer (a) and the oligomer (b) are both acrylic acid. Further, it is preferable that both the acrylic polymer (a) and the oligomer (b) do not contain a nitrogen atom-containing monomer as the monomer component.

Also, the invention provides a pressure-sensitive adhesive product containing a pressure-sensitive adhesive layer made of the pressure-sensitive adhesive composition.

DETAILED DESCRIPTION OF THE INVENTION

[Acrylic Polymer (a)]

The acrylic polymer (a) contains an alkyl (meth)acrylate, in which the alkyl group thereof has from 4 to 12 carbon atoms, as a monomer major component [hereinafter sometimes referred to as "$C_{4-12}$-alkyl (meth)acrylate"] and from 1 to 10 parts by weight, based on 100 parts by weight of the whole of the monomer components, of a carboxyl group-containing monomer as a monomer component. Accordingly, the acrylic polymer (a) is an acrylic polymer comprising a $C_{4-12}$-alkyl (meth)acrylate and a carboxyl group-containing monomer, and other monomer component may be used as the need arises.

The $C_{4-12}$-alkyl (meth)acrylate in the acrylic polymer (a) is not particularly limited so far as it is an alkyl (meth) acrylate in which the alkyl group thereof has from 4 to 12 carbon atoms (alkyl acrylates and alkyl methacrylates). Examples thereof include n-butyl (meth)acrylate, isobutyl (meth)acrylate, sec-butyl (meth)acrylate, t-butyl (meth) acrylate, pentyl (meth)acrylate, hexyl (meth)acrylate, heptyl (meth)acrylate, octyl (meth)acrylate, 2-ethylhexyl (meth) acrylate, isooctyl (meth)acrylate, nonyl (meth)acrylate, isononyl (meth)acrylate, decyl (meth)acrylate, isodecyl (meth)acrylate, undecyl (meth)acrylate, and dodecyl (meth) acrylate. As the $C_{4-12}$-alkyl (meth)acrylate, n-butyl (meth) acrylate is especially suitable.

The $C_{4-12}$-alkyl (meth)acrylate as the monomer major component can be used singly or in combination of two or more thereof.

In the acrylic polymer (a), it is important that the proportion of the $C_{4-12}$-alkyl (meth)acrylate is 50% by weight or more based on the whole amount of the monomer components because it is used as the monomer major component. The proportion of the $C_{4-12}$-alkyl (meth)acrylate is preferably 80% by weight or more, and more preferably 90% by weight or more. The upper limit of the proportion of the $C_{4-12}$-alkyl (meth)acrylate based on the whole amount of the monomer components is desirably not more than 99% by weight (especially, not more than 97% by weight) because at least a carboxyl group-containing monomer is contained as other monomer component. When the proportion of the $C_{4-12}$-alkyl (meth)acrylate is less than 50% by weight based on the whole amount of the monomer components, peeling strength or cohesive strength lowers.

Also, in the acrylic polymer (a), a carboxyl group-containing monomer is used as the monomer component. Examples of such a carboxyl group-containing monomer include (meth)acrylic acid (acrylic acid and methacrylic acid), itaconic acid, maleic acid, fumaric acid, and crotonic acid. Also, acid anhydrides of such a carboxyl group-containing monomer (for example, acid anhydride group-containing monomers such as maleic anhydride and itaconic anhydride) can be used as the carboxyl group-containing monomer.

The proportion of the carboxyl group-containing monomer can be selected within the range of from 1 to 10 parts by weight (preferably from 3 to 10 parts by weight, and more preferably from 3 to 5 parts by weight) based on 100 parts by weight of the whole of the monomer components. When the proportion of the carboxyl group-containing monomer is too small, good adhesiveness to an adherend cannot be secured. On the other hand, when it is too large, there may be the case of causing problems such as poor coating properties due to an increase of the viscosity of the pressure-sensitive adhesive.

In the acrylic polymer (a), a monomer (copolymerizable monomer) that is copolymerizable with the $C_{4-12}$-alkyl (meth)acrylate or carboxyl group-containing monomer can be used together, if desired. Incidentally, the proportion of such a copolymerizable monomer can be properly selected within the range of less than 50% by weight based on 100 parts by weight of the whole of the component components depending upon the kinds of the monomer components. However, for the sake of revealing good stickiness, it is desired to use the copolymerizable monomer in an amount such that the acrylic polymer (a) has a glass transition temperature of not higher than −20° C. (preferably from −70 to −35° C.).

Examples of such a copolymerizable monomer include $C_{1-3}$-alkyl (meth)acrylates such as methyl (meth)acrylate, ethyl (meth)acrylate, propyl (meth)acrylate, and isopropyl (meth)acrylate; $C_{13-20}$-alkyl (meth)acrylates such as tridecyl (meth)acrylate, tetradecyl (meth)acrylate, pentadecyl (meth) acrylate, hexadecyl (meth)acrylate, heptadecyl (meth) acrylate, octadecyl (meth)acrylate, nonadecyl (meth) acrylate, and eicosyl (meth)acrylate; non-aromatic ring-containing (meth)acrylates such as cycloalkyl (meth) acrylates [for example, cyclohexyl (meth)acrylate] and isobornyl (meth)acrylate; aromatic ring-containing (meth) acrylates such as aryl (meth)acrylates [for example, phenyl (meth)acrylate], aryloxyalkyl (meth)acrylates [for example, phenoxyethyl (meth)acrylate], and arylalkyl (meth)acrylates [for example, benzyl (meth)acrylate]; epoxy group-containing acrylic monomers such as glycidyl (meth) acrylate and methylglycidyl (meth)acrylate; vinyl ester based monomers such as vinyl acetate and vinyl propionate; styrene based monomers such as styrene and α-methylstyrene; hydroxyl group-containing monomers such as hydroxyethyl (meth)acrylate, hydroxypropyl (meth) acrylate, and hydroxybutyl (meth)acrylate; (meth)acrylic acid alkoxyalkyl based monomers such as methoxyethyl (meth)acrylate and ethoxyethyl (meth)acrylate; olefinic monomers such as ethylene, propylene, isoprene, and butadiene; and vinyl ether based monomers such as vinyl ether.

Also, in the acrylic polymer (a), as the copolymerizable monomer, polyfunctional monomers such as hexanediol di(meth)acrylate, (poly)ethylene glycol di(meth)acrylate, (poly)propylene glycol di(meth)acrylate, neopentyl glycol di(meth)acrylate, pentaerythritol di(meth)acrylate, glycerin di(meth)acrylate, trimethylolpropane tri(meth)acrylate, pentaerythritol tri(meth)acrylate, dipentaerythritol hexa(meth) acrylate, epoxy acrylate, polyester acrylates, urethane acrylate, divinylbenzene, butyl di(meth)acrylate, and hexyl di(meth)acrylate can be used.

Incidentally, nitrogen atom-containing monomers [for example, (meth)acrylic acid aminoalkyl based monomers such as aminoethyl (meth)acrylate, N,N-dimethylaminoethyl (meth)acrylate, and t-butylaminoethyl (meth)acrylate; (N-substituted)amide based monomers such as (meth)acrylamide, N,N-dimethyl(meth)acrylamide, N-butyl(meth)acrylamide, and N-hydroxy(meth)

acrylamide; cyano acrylate based monomers such as acrylonitrile and methacrylonitrile; and isocyanate group-containing monomers such as 2-methacryloyloxyethyl isocyanate] may be used as the copolymerizable monomer. However, since such a nitrogen atom-containing monomer becomes a cause of yellowing of the pressure-sensitive adhesive under heating, it is desired that a nitrogen atom-containing monomer is not used.

The acrylic polymer (a) can be prepared by known or customary polymerization methods. Examples of the polymerization method of the acrylic polymer (a) include a solution polymerization method, an emulsion polymerization method, a block polymerization method, and a polymerization method by irradiation with ultraviolet light. Of these, the solution polymerization method is suitable in view of transparency, water resistance, and costs.

Incidentally, a polymerization initiator, a chain transfer agent, and the like that are used in the polymerization of the acrylic polymer (a) are not particularly limited but properly selected and used among known or customary ones. More specifically, examples of the polymerization initiator include azo based polymerization initiators such as 2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), and dimethyl-2,2'-azobis(2-methylpropionate); and peroxide based polymerization initiators such as benzoyl peroxide, t-butyl hydroperoxide, di-t-butyl peroxide, t-butyl peroxybenzoate, dicumyl peroxide, 1,1-bis(t-butylperoxy)-3,3,5-trimethylcyclohexane, and 1,1-bis(t-butylperoxy) cyclododecane. In the case of solution polymerization, it is preferred to use an oil-soluble polymerization initiator. The polymerization initiator can be used singly or in combination of two or more thereof. As the amount of the polymerization initiator to be used, a usual use amount may be employed, and for example, it can be selected within the range of from about 0.01 to 1 part by weight based on 100 parts by weight of the whole of the monomer components.

Also, examples of the chain transfer agent include 2-mercaptoethanol, lauryl mercaptan, glycidyl mercaptan, mercaptoacetic acid, thioglycollic acid, 2-ethylhexyl thioglycollate, 2,3-dimethylmercapto-1-propanol, and an α-methylstyrene dimer.

Incidentally, in the solution polymerization, a variety of general solvents can be used. Examples of such solvents include organic solvents such as esters, for example, ethyl acetate and n-butyl acetate; aromatic hydrocarbons, for example, toluene and benzene; aliphatic hydrocarbons, for example, n-hexane and n-heptane; alicyclic hydrocarbons, for example, cyclohexane and methylcyclohexane; and ketones, for example, methyl ethyl ketone and methyl isobutyl ketone. The solvent can be used singly or in combination of two or more thereof.

In the invention, it is important that the acrylic polymer (a) has a weight average molecular weight of from 500,000 to 900,000. The weight average molecular weight of the acrylic polymer (a) is preferably from 550,000 to 850,000 (more preferably from 600,000 to 800,000). In the case where the weight average molecular weight of the acrylic polymer (a) is less than 500,000, the resulting composition cannot exhibit an adhesive strength necessary as the pressure-sensitive adhesive. On the other hand, when it exceeds 900,000, there may be the case of causing problems such as poor coating properties due to an increase of the viscosity of the pressure-sensitive adhesive.

The weight average molecular weight of the acrylic polymer (a) can be controlled by the concentration of the monomer, the dropping rate of the monomer, and the like in addition to the kinds and use amounts of the polymerization initiator and chain transfer agent, and the temperature and time in the polymerization.

[Oligomer (b)]

The oligomer (b) contains an ethylenically unsaturated monomer, in which a homopolymer formed therefrom has a glass transition temperature of from 60 to 190° C. and which has a cyclic structure [hereinafter sometimes referred to as "ring-containing ethylenically unsaturated monomer having a Tg of from 60 to 190° C."], as a monomer major component and from 1 to 10 parts by weight, based on 100 parts by weight of the whole of the monomer components, of a carboxyl group-containing monomer as a monomer component. The oligomer (b) is an oligomer comprising a ring-containing ethylenically unsaturated monomer having a Tg of from 60 to 190° C. and a carboxyl group-containing monomer, and other monomer component may be used as the need arises.

Incidentally, an ethylenically unsaturated monomer in which a homopolymer formed therefrom has a glass transition temperature of 60° C. or higher and which has a cyclic structure can be used as the oligomer (b).

In the oligomer (b), the ring-containing ethylenically unsaturated monomer having a Tg of from 60 to 190° C. is not particularly limited so far as it is an ethylenically unsaturated monomer in which a homopolymer formed therefrom has a glass transition temperature of from 60 to 190° C. and which has a cyclic structure in the molecule thereof. As the ring in such a ring-containing ethylenically unsaturated monomer having a Tg of from 60 to 190° C., an aromatic ring and a non-aromatic ring may be both employed, but a non-aromatic ring is suitable. Examples of the foregoing aromatic ring include aromatic hydrocarbon rings (for example, a benzene ring and a fused carbon ring in naphthalene, etc.) and a variety of aromatic heterocyclic rings. Also, examples of the foregoing non-aromatic rings include non-aromatic alicyclic rings (for example, cycloalkane rings such as a cyclopentane ring, a cyclohexane ring, a cycloheptane ring, and a cyclooctane ring; and cycloalkene rings such a cyclohexene ring) and non-aromatic crosslinking rings (for example, crosslinking hydrocarbon rings including bicyclic hydrocarbon rings in pinane, pinene, bornane, norbornane, norbornene, etc.; tricyclic hydrocarbon rings in adamantane, etc.; and tetracyclic hydrocarbon rings).

As such a ring-containing ethylenically unsaturated monomer having a Tg of from 60 to 190° C., for example, one in which a homopolymer formed therefrom has a glass transition temperature of 60° C. or higher (especially, from 60 to 190° C.) can be properly selected and used among ethylenically unsaturated monomers having a cyclic structure in the molecule thereof including non-aromatic ring-containing (meth)acrylates such as cycloalkyl (meth) acrylates (for example, cyclohexyl (meth)acrylate) and isobornyl (meth)acrylate; aromatic ring-containing (meth) acrylates such as aryl (meth)acrylates (for example, phenyl (meth)acrylate), aryloxyalkyl (meth)acrylates (for example, phenoxyethyl (meth) acrylate), and arylalkyl (meth) acrylates (for example, benzyl (meth)acrylate); and styrene based monomers such as styrene and α-methylstyrene. That is, ethylenically unsaturated monomers having a cyclic structure, in which a homopolymer formed therefrom has a glass transition temperature of 60° C. or higher (especially, from 60 to 190° C.), can be used.

In the invention, as the ring-containing ethylenically unsaturated monomer having a Tg of from 60 to 190° C., non-aromatic ring-containing (meth)acrylates such as cyclohexyl methacrylate and isobornyl (meth)acrylate are especially suitable. Of these, cyclohexyl methacrylate can be suitably used from the viewpoint of transparency.

The ring-containing ethylenically unsaturated monomer having a Tg of from 60 to 190° C. as the monomer major component can be used singly or in combination of two or more thereof.

In the oligomer (b), it is important that the proportion of the ring-containing ethylenically unsaturated monomer having a Tg of from 60 to 190° C. is 50% by weight or more based on the whole amount of the monomer components because it is used as the monomer major component. The proportion of the ring-containing ethylenically unsaturated monomer having a Tg of from 60 to 190° C. is preferably 80% by weight or more, and more preferably 90% by weight or more. The upper limit of the proportion of the ring-containing ethylenically unsaturated monomer having a Tg of from 60 to 190° C. based on the whole amount of the monomer components is desirably not more than 99% by weight (especially, not more than 97% by weight) because at least a carboxyl group-containing monomer is contained as other monomer component. When the proportion of the ring-containing ethylenically unsaturated monomer having a Tg of from 60 to 190° C. is less than 50% by weight based on the whole amount of the monomer components, peeling strength or cohesive strength lowers.

Also, in the oligomer (b), a carboxyl group-containing monomer is used as the monomer component. Likewise the carboxyl group-containing monomer of the foregoing acrylic polymer (a), examples of such a carboxyl group-containing monomer include (meth)acrylic acid, itaconic acid, maleic acid, fumaric acid, and crotonic acid. Also, acid anhydrides of such a carboxyl group-containing monomer (for example, acid anhydride group-containing monomers such as maleic anhydride and itaconic anhydride) can be used as the carboxyl group-containing monomer.

The proportion of the carboxyl group-containing monomer can be selected within the range of from 1 to 10 parts by weight (preferably from 3 to 10 parts by weight, and more preferably from 3 to 5 parts by weight) based on 100 parts by weight of the whole of the monomer components. When the proportion of the carboxyl group-containing monomer is too small, the transparency is liable to lower, whereas when it is too large, the temperature control at the time of the polymerization tends to become difficult, and hence, the both are not preferable.

In the oligomer (b), a monomer (copolymerizable monomer) that is copolymerizable with the ring-containing ethylenically unsaturated monomer having a Tg of from 60 to 190° C. or carboxyl group-containing monomer can be used together, if desired. Incidentally, the proportion of such a copolymerizable monomer can be properly selected within the range of less than 50% by weight based on 100 parts by weight of the whole of the component components depending upon the kinds of the monomer components. However, for the sake of revealing good stickiness, it is desired to use the copolymerizable monomer in an amount such that the oligomer (b) has a glass transition temperature of 60° C. or higher (preferably from 65 to 180° C.). Incidentally, when the glass transition temperature of the oligomer (b) is lower than 60° C., adhesiveness of the pressure-sensitive adhesive lowers, resulting in a lowering of the lifting and peeling preventing properties.

Examples of such a copolymerizable monomer include alkyl (meth)acrylates such as methyl (meth)acrylate, ethyl (meth)acrylate, propyl (meth)acrylate, isopropyl (meth)acrylate, n-butyl (meth)acrylate, isobutyl (meth)acrylate, sec-butyl (meth)acrylate, t-butyl (meth)acrylate, pentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth) acrylate, decyl (meth)acrylate, and isodecyl (meth)acrylate; epoxy group-containing acrylic monomers such as glycidyl (meth) acrylate and methylglycidyl (meth) acrylate; vinyl ester based monomers such as vinyl acetate and vinyl propionate; hydroxyl group-containing monomers such as hydroxyethyl (meth)acrylate, hydroxypropyl (meth) acrylate, and hydroxybutyl (meth)acrylate; (meth)acrylic acid alkoxy-alkyl based monomers such as methoxyethyl (meth)acrylate and ethoxyethyl (meth)acrylate; olefinic monomers such as ethylene, propylene, isoprene, and butadiene; and vinyl ether based monomers such as vinyl ether.

Also, in the oligomer (b), as the copolymerizable monomer, polyfunctional monomers such as hexanediol di(meth)acrylate, (poly)ethylene glycol di(meth)acrylate, (poly)propylene glycol di(meth)acrylate, neopentyl glycol di(meth)acrylate, pentaerythritol di(meth)acrylate, glycerin di(meth)acrylate, trimethylolpropane tri(meth)acrylate, pentaerythritol tri(meth)acrylate, dipentaerythritol hexa(meth) acrylate, epoxy acrylate, polyester acrylates, urethane acrylate, divinylbenzene, butyl di(meth)acrylate, and hexyl di(meth)acrylate can be used.

Incidentally, nitrogen atom-containing monomers [for example, (meth)acrylic acid aminoalkyl based monomers such as aminoethyl(meth) acrylate, N,N-dimethylaminoethyl (meth)acrylate, and t-butylaminoethyl (meth)acrylate; (N-substituted)amide based monomers such as (meth)acrylamide, N,N-dimethyl(meth)acrylamide, N-butyl(meth)acrylamide, and N-hydroxy(meth) acrylamide; cyano acrylate based monomers such as acrylonitrile and methacrylonitrile; and isocyanate group-containing monomers such as 2-methacryloyloxyethyl isocyanate] may be used as the copolymerizable monomer. However, since such a nitrogen atom-containing monomer becomes a cause of yellowing of the pressure-sensitive adhesive under heating, it is desired that a nitrogen atom-containing monomer is not used.

The oligomer (b) can be prepared by known or customary polymerization methods. Likewise the polymerization method of the foregoing acrylic polymer (a), examples of the polymerization method of the oligomer (b) include a solution polymerization method, an emulsion polymerization method, a block polymerization method, and a polymerization method by irradiation with ultraviolet light. Of these, the solution polymerization method is suitable in view of transparency, water resistance, and costs.

Incidentally, a polymerization initiator, a chain transfer agent, and the like that are used in the polymerization of the oligomer (b) are not particularly limited but properly selected and used among known or customary ones. More specifically, examples of the polymerization initiator include azo based polymerization initiators such as 2,2'-azobisisobutyronitrile, 2,2'-azo-bis(4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), and dimethyl-2,2'-azobis(2-methylpropionate); and peroxide based polymerization initiators such as benzoyl peroxide, t-butyl hydroperoxide, di-t-butyl peroxide, t-butyl peroxybenzoate, dicumyl peroxide, 1,1-bis(t-butylperoxy)-3,3,5-trimethylcyclohexane, and 1,1-bis(t-butylperoxy)cyclododecane. In the case of solution polymerization, it is preferred to use an oil-soluble polymerization initiator. The polymerization initiator can be used singly or in combination of two or more thereof. As the amount of the polymerization initiator to be used, a usual use amount may be employed, and for example, it can be selected within the range of from about 0.1 to 15 parts by weight based on 100 parts by weight of the whole of the monomer components.

Also, examples of the chain transfer agent include 2-mercaptoethanol, lauryl mercaptan, glycidyl mercaptan, mercaptoacetic acid, thioglycollic acid, 2-ethylhexyl thioglycollate, 2,3-dimethylmercapto-1-propanol, and an α-methylstyrene dimer. The amount of the chain transfer agent to be used can be, for example, selected within the range of from about 0.01 to 15 parts by weight based on 100 parts by weight of the whole of the monomer components.

Incidentally, in the solution polymerization, a variety of general solvents can be used. Examples of such solvents include organic solvents such as esters, for example, ethyl acetate and n-butyl acetate; aromatic hydrocarbons, for example, toluene and benzene; aliphatic hydrocarbons, for example, n-hexane and n-heptane; alicyclic hydrocarbons, for example, cyclohexane and methylcyclohexane; and ketones, for example, methyl ethyl ketone and methyl isobutyl ketone. The solvent can be used singly or in combination of two or more thereof.

In the invention, it is important that the oligomer (b) has a weight average molecular weight of from 3,000 to 6,000. The weight average molecular weight of the oligomer (b) is preferably from 3,300 to 5,500 (more preferably from 3,500 to 5,000).

The weight average molecular weight of the oligomer (b) can be controlled by the concentration of the monomer, the dropping rate of the monomer, and the like in addition to the kinds and use amounts of the polymerization initiator and chain transfer agent, and the temperature and time in the polymerization.

Incidentally, in the invention, the weight average molecular weight (Mw) of the acrylic polymer (a) and the oligomer (b) can be measured by gel permeation chromatography (GPC). More concretely, the weight average molecular weight can be measured and determined from a value reduced as polystyrene using HLC-8120GPC (a trade name, manufactured by Tosoh Corporation) as a GPC analyzer under the following GPC measurement conditions.

GPC measurement conditions:
Sample concentration: 0.2% by weight (tetrahydrofuran solution)
Injection amount of sample: 10 μL (The character "L" as used herein means "liter")
Eluant: Tetrahydrofuran (THF)
Flow rate: 0.6 mL/min
Column temperature (measurement temperature): 40° C.
Column: TSK Gel Super HM-H/H4000/H3000/H2000 (a trade name, manufactured by Tosoh Corporation)
Detector: Differential refractometer

[Pressure-sensitive Adhesive Composition]

The pressure-sensitive adhesive composition contains the foregoing acrylic polymer (a) and the foregoing oligomer (b). For this reason, a pressure-sensitive adhesive layer made of the pressure-sensitive adhesive composition has excellent transparency. Also, in the case of sticking to a plastic substrate or the like, it has excellent lifting and peeling preventing properties (resistance to foaming and peeling) such that lifting or peeling at the adhesion interface due to air bubbles (foams) generated from the plastic substrate or the like is not caused. Accordingly, when the pressure-sensitive adhesive composition of the invention is used as a pressure-sensitive adhesive layer in sticking an optical film to a substrate, even if air bubbles are generated from the substrate or the like under severe conditions such as high-temperature conditions, it can prevent lifting and peeling from occurrence due to air bubbles generated from the substrate at the adhesion interface and adhere the optical film to the substrate with excellent adhesiveness. Moreover, it can keep excellent visibility of the optical film. Accordingly, there is not caused poor appearance.

In the pressure-sensitive adhesive composition, the proportion of the acrylic polymer (a) to the oligomer (b) is not particularly limited. However, the oligomer (b) can be used in a proportion of from 10 to 35 parts by weight (preferably from 15 to 30 parts by weight) based on 100 parts by weight of the acrylic polymer (a). When the proportion of the oligomer (b) is less than 10 parts by weight based on 100 parts by weight of the acrylic polymer (a), the effects to be brought by the addition of the oligomer (b) are hardly exhibited. On the other hand, when it exceeds 35 parts by weight, a pressure-sensitive adhesive characteristic by the acrylic polymer (a) may possibly be largely influenced.

If desired, the pressure-sensitive adhesive composition may contain known additives such as a crosslinking agent, a ultraviolet light absorber, an antioxidant, a light stabilizer, an anti-aging agent, a tackifier, a plasticizer, a softening agent, a filler, a coloring agent (for example, pigments and dyes), a surfactant, and an antistatic agent in addition to the acrylic polymer (a) and the oligomer (b).

In the invention, it is possible to further increase the cohesive strength as a pressure-sensitive adhesive by crosslinking the acrylic polymer (a) and the oligomer (b) using a crosslinking agent. Accordingly, it is preferable that the pressure-sensitive adhesive composition of the invention contains a crosslinking agent together with the acrylic polymer (a) and the oligomer (b). Incidentally, as the crosslinking method, a heat crosslinking method is suitably employed.

The foregoing crosslinking agent widely includes conventionally known crosslinking agents. As the crosslinking agent, polyfunctional melamine compounds, polyfunctional epoxy compounds, and polyfunctional isocyanate compounds are especially preferable. The crosslinking agent can be used singly or in admixture of two or more thereof.

Examples of polyfunctional melamine compounds include methylated trimethylolmelamine and butylated hexamethylol-melamine. Also, examples of polyfunctional epoxy compounds include diglycidyl aniline and glycerin diglycidyl ether. Also, examples of polyfunctional isocyanate compounds include dimers (for example, tolylene diisocyanate, hexamethylene diisocyanate, polymethylene polyphenyl isocyanate, diphenylmethane diisocyanate, and diphenylmethane diisocyanate), a reaction product between trimethylolpropane and tolylene diisocyanate, a reaction product between trimethylolpropane and hexamethylene diisocyanate, polyether polyisocyanates, and polyester polyisocyanates.

The amount of the crosslinking agent to be use is not particularly limited. For example, it can be selected within the range of from about 0.001 to 20 parts by weight (preferably from 0.001 to 10 parts by weight) based on 100 parts by weight of the acrylic polymer (a). Incidentally, the crosslinking agent can be used singly or in combination of two or more thereof.

The pressure-sensitive adhesive composition can be prepared by mixing the acrylic polymer (a), the oligomer (b), and optionally other additives such as a crosslinking agent.

[Pressure-sensitive Adhesive Product]

The pressure-sensitive adhesive product of the invention includes pressure-sensitive adhesive tapes and pressure-sensitive adhesive sheets. The pressure-sensitive adhesive product has a pressure-sensitive adhesive layer made of the foregoing pressure-sensitive adhesive composition. For example, the pressure-sensitive adhesive layer made of the foregoing pressure-sensitive adhesive composition may be formed on at least one surface of a base material or may be formed on a release film. That is, so far as the pressure-sensitive adhesive product is provided with a pressure-sensitive adhesive layer made of the forgoing pressure-sensitive adhesive composition, it may be a pressure-sensitive adhesive product having a base material or may be a pressure-sensitive adhesive product not having a base material (for example, base material-less type double-sided pressure-sensitive adhesive tapes or sheets). Incidentally, in the case of a pressure-sensitive adhesive product having a base material, the pressure-sensitive adhesive layer may be provided on only one surface of the base material or may be provided on the both surfaces of the base material.

Incidentally, the pressure-sensitive adhesive product may have other layer (for example, an interlayer and an undercoating layer) so far as the effects of the invention are not hindered.

It is important that the base material has transparency. Examples of such a transparent base material include polyolefin films or sheets such as polypropylene films or sheets, polyethylene films or sheets, and ethylene-propylene copolymer films or sheets); polyester films or sheets such as polyethylene terephthalate films or sheets; polyimide films or sheets; polyvinyl chloride films or sheets; and plastic films or sheets such as polyvinyl acetate films or sheets.

The thickness of the base material can be properly selected depending upon the desired pressure-sensitive adhesive product. For example, it can be selected within the range of from about 10 to 1,000 $\mu$m. Incidentally, the base material may be in the form of either a single layer or multiple layers.

The surface of the base material may be subjected to proper known or customary surface treatments such as physical treatments such as corona discharge treatment and plasma treatment and chemical treatments such as undercoating treatment and backside treatment.

The pressure-sensitive adhesive product of the invention can be produced according to the usual production method of pressure-sensitive adhesive products depending upon the kind of the pressure-sensitive adhesive product. For example, pressure-sensitive adhesive products having a base material can be, for example, prepared by a method in which the foregoing pressure-sensitive adhesive composition is directly coated on at least one surface (one surface or both surfaces) of a base material such that the thickness after drying becomes a prescribed thickness; or a method in which the foregoing pressure-sensitive adhesive composition is coated on a separator such that the thickness after drying becomes a prescribed thickness, to form a pressure-sensitive adhesive layer, which is then transferred onto a base material. Also, in the case where a backside treated layer (release treated layer) is formed on the back surface of a base material, roll-shaped wound pressure-sensitive adhesive tapes can be prepared by superimposing a pressure-sensitive adhesive layer formed on one surface of the base material and the backside treated layer of the back surface and winding up them the roll shape.

Incidentally, in coating the pressure-sensitive adhesive composition, customary coaters such as a gravure roll coater, a reverse roll coater, a kiss roll coater, a dip roll coater, a bar coater, a knife coater, and a spray coater can be employed.

In the invention, for the sake of protecting the pressure-sensitive adhesive layer, it is desired to laminate a release liner on the pressure-sensitive adhesive layer. Also, in the case where a release liner is not used, it is desired to subject the back surface of a base material to backside treatment with a release treating agent (for example, a silicone based releasing agent, a fluorine based releasing agent, and a long chain alkyl based releasing agent).

The release liner is not particularly limited but can be properly selected and used among known release liners.

Incidentally, the pressure-sensitive adhesive layer may be in the form of either a single layer or a laminate. The thickness of the pressure-sensitive adhesive layer (the thickness of the pressure-sensitive adhesive layer in one side in the case where the pressure-sensitive adhesive layer is formed on the both surfaces of a base material) is, for example, from about 5 to 1,000 $\mu$m (preferably from 10 to 100 $\mu$m).

The pressure-sensitive adhesive product can exhibit excellent transparency because it has a pressure-sensitive adhesive layer made of the foregoing pressure-sensitive adhesive composition. Incidentally, in this case, when a base material is used, it is important to use a transparent base material. Further, in the case of sticking to a plastic substrate or the like, the pressure-sensitive adhesive product has excellent lifting and peeling preventing properties (resistance to foaming and peeling) so that lifting or peeling at the adhesion interface due to air bubbles (foams) generated from the plastic substrate or the like can be effectively suppressed or prevented, and has excellent durability. Also, it does not cause poor appearance. Accordingly, the pressure-sensitive adhesive product of the invention can be suitably used as a pressure-sensitive adhesive product (especially, pressure-sensitive adhesive tapes or pressure-sensitive adhesive sheets) in sticking and fixing an optical film. That is, the pressure-sensitive adhesive product of the invention is useful as a pressure-sensitive adhesive tape or sheet for fixing an optical film.

The optical film is not particularly limited so far as it is a film (or a sheet) having optical characteristics. Examples thereof include film light guiding plates, antireflection films, and conductive films.

As an adherend to be stuck in fixing the optical film, transparent substrates can be used. Examples of such transparent substrates include transparent plastic substrates and transparent glass substrates. The transparent plastic substrate is not particularly limited. Examples thereof include polycarbonate-made substrates, acrylic resin-made substrates (for example, polymethyl methacrylate-made substrates), polyester-made substrates (for example, polyethylene terephthalate-made substrates), and triacetyl cellulose-made substrates. Also, the transparent glass substrate is not particularly limited, but glass substrates made of various glass materials can be used. Examples of such transparent substrates (for example, transparent plastic substrates and transparent glass substrates) include touch panels and a variety of display panels (display panels in various displays). Examples of the foregoing display panel include display panels of cathode-ray tube, display panels of plasma display, and display panels of EL display as well as liquid crystal panels.

Incidentally, a product or device in which an optical film is stuck to a transparent substrate using the pressure-sensitive adhesive product of the invention can be applied as a display device or a member of display device. Examples of such a display device include liquid crystal display devices, cathode-ray tube display devices, plasma display devices, and EL display devices.

Since the pressure-sensitive adhesive composition of the invention has the foregoing constitution, it is excellent in transparency and excellent in lifting and peeling preventing properties. Accordingly, even when it is used in sticking an optical film to a substrate, it can prevent lifting and peeling from occurrence due to air bubbles generated from the substrate, enables one to perform adhering with excellent adhesiveness, and can keep excellent visibility of the optical film.

The invention will be described below in detail with reference to the following Examples, but it should not be construed that the invention is limited thereto.

[Preparation Example 1 of Acrylic Polymer]

In a separable flask, 97 parts by weight of butyl acrylate and 3 parts by weight of acrylic acid as monomer components, 0.3 part by weight of 2,2'-azobisisobutyronitrile as a polymerization initiator, and 233.8 parts by weight of ethyl acetate as a polymerization solvent were charged, and the mixture was stirred for one hour while introducing a nitrogen gas. After removing oxygen in the polymerization system in this way, the temperature was raised to 63° C., and the mixture was allowed to react for 10 hours, to obtain an acrylic polymer solution (hereinafter sometimes referred to as "acrylic polymer solution A") having a solids content of 30% by weight. An acrylic polymer (hereinafter sometimes referred to as "polymer A") in the acrylic polymer solution A had a weight average molecular weight of 550,000.

[Preparation Example 2 of Acrylic Polymer]

An acrylic polymer solution (hereinafter sometimes referred to as "acrylic polymer solution B") having a solids content of 30% by weight was obtained in the same manner as in Preparation Example 1 of Acrylic Polymer, except for using 95 parts by weight of butyl acrylate and 5 parts by weight of acrylic acid as monomer components and 0.2 part by weight of 2,2'-azobisisobutyronitrile as a polymerization initiator. An acrylic polymer (hereinafter sometimes referred to as "polymer B") in the acrylic polymer solution B had a weight average molecular weight of 700,000.

[Preparation Example 3 of Acrylic Polymer]

An acrylic polymer solution (hereinafter sometimes referred to as "acrylic polymer solution C") having a solids content of 30% by weight was obtained in the same manner as in Preparation Example 1 of Acrylic Polymer, except for using 0.1 part by weight of 2,2'-azobisisobutyronitrile as a polymerization initiator. An acrylic polymer (hereinafter sometimes referred to as "polymer C") in the acrylic polymer solution C had a weight average molecular weight of 1,200,000. Accordingly, the weight average molecular weight of the polymer C exceeded 900,000.

[Preparation Example 1 of Oligomer]

In a separable flask, 95 parts by weight of cyclohexyl methacrylate [glass transition temperature of homopolymer (polycyclohexyl methacrylate): 66° C.] and 5 parts by weight of acrylic acid as monomer components, 3 parts by weight of 2-mercaptoethanol as a chain transfer agent, 0.2 part by weight of 2,2'-azobisisobutyronitrile as a polymerization initiator, and 103.2 parts by weight of toluene as a polymerization solvent were charged, and the mixture was stirred for one hour while introducing a nitrogen gas. After removing oxygen in the polymerization system in this way, the temperature was raised to 70° C., and the mixture was allowed to react for 3 hours and further at 75° C. for 2 hours, to obtain an oligomer solution (hereinafter sometimes referred to as "oligomer solution A") having a solids content of 50% by weight. An oligomer (hereinafter sometimes referred to as "oligomer A") in the oligomer solution A had a weight average molecular weight of 4,000.

[Preparation Example 2 of Oligomer]

In a separable flask, 95 parts by weight of cyclohexyl methacrylate [glass transition temperature of homopolymer (polycyclohexyl methacrylate): 66° C.] and 5 parts by weight of acrylic acid as monomer components, 10 parts by weight of an α-methylstyrene dimer as a chain transfer agent, 10 parts by weight of 2,2'-azobisisobutyronitrile as a polymerization initiator, and 120 parts by weight of toluene as a polymerization solvent were charged, and the mixture was stirred for one hour while introducing a nitrogen gas. After removing oxygen in the polymerization system in this way, the temperature was raised to 85° C., and the mixture was allowed to react for 5 hours, to obtain an oligomer solution (hereinafter sometimes referred to as "oligomer solution B") having a solids content of 50% by weight. An oligomer (hereinafter sometimes referred to as "oligomer B") in the oligomer solution B had a weight average molecular weight of 4,300.

[Preparation Example 3 of Oligomer]

An oligomer solution (hereinafter sometimes referred to as "oligomer solution C") having a solids content of 50% by weight was obtained in the same manner as in Preparation Example 1 of Oligomer, except for using 1.5 part by weight of 2-mercaptoethanol as a chain transfer agent and 103.5 parts by weight of toluene. An oligomer (hereinafter sometimes referred to as "oligomer C") in the oligomer solution C had a weight average molecular weight of 8,100. Accordingly, the weight average molecular weight of the oligomer C exceeded 6,000.

[Preparation Example 4 of Oligomer]

In a separable flask, 95 parts by weight of cyclohexyl methacrylate [glass transition temperature of homopolymer (polycyclohexyl methacrylate): 66° C.] and 5 parts by weight of diethylacrylamide as monomer components, 3 parts by weight of 2-mercaptoethanol as a chain transfer agent, 0.2 part by weight of 2,2'-azobisisobutyronitrile as a polymerization initiator, and 103.2 parts by weight of toluene as a polymerization solvent were charged, and the mixture was stirred for one hour while introducing a nitrogen gas. After removing oxygen in the polymerization system in this way, the temperature was raised to 70° C., and the mixture was allowed to react for 3 hours and further at 75° C. for 2 hours, to obtain an oligomer solution (hereinafter sometimes referred to as "oligomer solution D") having a solids content of 50% by weight. An oligomer (hereinafter sometimes referred to as "oligomer D") in the oligomer solution D had a weight average molecular weight of 3,700. Accordingly, in the oligomer D, a carboxyl group-containing monomer is not used as the monomer component.

[Preparation Example 5 of Oligomer]

In a separable flask, 97 parts by weight of ethyl acrylate [glass transition temperature of homopolymer (polyethyl acrylate): 65° C.] and 3 parts by weight of acrylic acid as monomer components, 3 parts by weight of 2-mercaptoethanol as a chain transfer agent, 0.2 part by weight of 2,2'-azobisisobutyronitrile as a polymerization initiator, and 103.2 parts by weight of toluene as a polymerization solvent were charged, and the mixture was stirred for one hour while introducing a nitrogen gas. After removing oxygen in the polymerization system in this way, the temperature was raised to 70°C., and the mixture was allowed to react for 3 hours and further at 75° C. for 2 hours, to obtain an oligomer solution (hereinafter sometimes referred to as "oligomer solution E") having a solids content of 50% by weight. An oligomer (hereinafter sometimes referred to as "oligomer E") in the oligomer solution E had a weight average molecular weight of 4,500. Accordingly, in the oligomer E, an ethylenically unsaturated monomer having a cyclic structure is not used as the monomer major component.

Incidentally, in the foregoing Preparation Examples 1 to 3 of Acrylic Polymer and Preparation Examples 1 to 5 of Oligomer, the weight average molecular weight (Mw) of each of the acrylic polymers (polymers A to C) and the oligomers (oligomers A to E) was measured and determined from a value reduced as polystyrene using HLC-8120GPC (a trade name, manufactured by Tosoh Corporation) as a gel permeation chromatograph (GPC) analyzer under the following GPC measurement conditions.

GPC measurement conditions:

Sample concentration: 0.2% by weight (tetrahydrofuran solution)

Injection amount of sample: 10 $\mu$L

Eluant: Tetrahydrofuran (THF)

Flow rate: 0.6 mL/min

Column temperature (measurement temperature): 40° C.

Column: TSK Gel Super HM-H/H4000/H3000/H2000 (a trade name, manufactured by Tosoh Corporation)

Detector: Differential refractometer

EXAMPLE 1

100 parts (solids content) of the acrylic polymer solution A was mixed with 20 parts by weight (solids content) of the oligomer A and 0.05 part by weight (solids content) of a crosslinking agent, Tetrad C (a trade name of a tetrafunctional epoxy based crosslinking agent, manufactured by Mitsubishi Gas Chemical Company, Inc.) to prepare a pressure-sensitive adhesive solution. This pressure-sensitive adhesive solution was cast and coated on the release treated surface of a polyethylene terephthalate film (thickness: 38 $\mu$m), one surface of which had been subjected to release treatment, in a thickness after drying of about 25 $\mu$m, heat dried at 130° C. for 3 minutes, and further aged at 50° C. for 72 hours, to obtain a pressure-sensitive adhesive sheet. This pressure-sensitive adhesive sheet is a base material-less double-sided pressure-sensitive adhesive sheet.

EXAMPLE 2

A pressure-sensitive adhesive solution was prepared in the same manner as in Example 1, except for mixing 100 parts (solids content) of the acrylic polymer solution B with 20 parts by weight (solids content) of the oligomer B and 0.05 part by weight (solids content) of a crosslinking agent, Tetrad C (a trade name of a tetrafunctional epoxy based crosslinking agent, manufactured by Mitsubishi Gas Chemical Company, Inc.), and a pressure-sensitive adhesive sheet was prepared in the same manner as in Example 1, except for using this pressure-sensitive adhesive solution.

Comparative Example 1

A pressure-sensitive adhesive solution was prepared in the same manner as in Example 1, except for mixing 100 parts (solids content) of the acrylic polymer solution C with 20 parts by weight (solids content) of the oligomer A and 0.05 part by weight (solids content) of a crosslinking agent, Tetrad C (a trade name of a tetrafunctional epoxy based crosslinking agent, manufactured by Mitsubishi Gas Chemical Company, Inc.), and a pressure-sensitive adhesive sheet was prepared in the same manner as in Example 1, except for using this pressure-sensitive adhesive solution.

Comparative Example 2

A pressure-sensitive adhesive solution was prepared in the same manner as in Example 1, except for mixing 100 parts (solids content) of the acrylic polymer solution B with 20 parts by weight (solids content) of the oligomer C and 0.05 part by weight (solids content) of a crosslinking agent, Tetrad C (a trade name of a tetrafunctional epoxy based crosslinking agent, manufactured by Mitsubishi Gas Chemical Company, Inc.), and a pressure-sensitive adhesive sheet was prepared in the same manner as in Example 1, except for using this pressure-sensitive adhesive solution.

Comparative Example 3

A pressure-sensitive adhesive solution was prepared in the same manner as in Example 1, except for mixing 100 parts (solids content) of the acrylic polymer solution B with 20 parts by weight (solids content) of the oligomer D and 0.05 part by weight (solids content) of a crosslinking agent, Tetrad C (a trade name of a tetrafunctional epoxy based crosslinking agent, manufactured by Mitsubishi Gas Chemical Company, Inc.), and a pressure-sensitive adhesive sheet was prepared in the same manner as in Example 1, except for using this pressure-sensitive adhesive solution.

Comparative Example 4

A pressure-sensitive adhesive solution was prepared in the same manner as in Example 1, except for mixing 100 parts (solids content) of the acrylic polymer solution B with 20 parts by weight (solids content) of the oligomer E and 0.05 part by weight (solids content) of a crosslinking agent, Tetrad C (a trade name of a tetrafunctional epoxy based crosslinking agent, manufactured by Mitsubishi Gas Chemical Company, Inc.), and a pressure-sensitive adhesive sheet was prepared in the same manner as in Example 1, except for using this pressure-sensitive adhesive solution.

(Evaluation)

Each of the pressure-sensitive adhesive sheets obtained in Examples 1 to 2 and Comparative Examples 1 to 4 was evaluated with respect to transparency, lifting and peeling preventing properties, adhesive strength and coating properties according to the following measurement or evaluation methods. Incidentally, the evaluation results are shown in Table 1

(Evaluation Method of Transparency)

Each of the pressure-sensitive adhesive sheets obtained in Examples 1 to 2 and Comparative Examples 1 to 4 was stuck to a slide glass (a trade name: S-1111, manufactured by Murakami Glass Ind. Ltd.) to prepare a specimen having a layer construction of pressure-sensitive adhesive layer/slide glass, and a haze value (%) of the specimen was measured using a haze meter (a trade name of device: HM-150, manufactured by Murakami Color Research Laboratory). Incidentally, the haze value (%) was determined by the expression, {[diffused transmittance (%)]/[total light transmittance (%)]×100}.

(Evaluation Method of Lifting and Peeling Preventing Properties)

Each of the pressure-sensitive adhesive sheets obtained in Examples 1 to 2 and Comparative Examples 1 to 4 was laminated on a polyethylene terephthalate film (a PET film having a thickness of 188 μm), and the laminate was stuck and fixed to a polycarbonate plate (a PC plate having a thickness of 1 mm) to prepare a sample piece having a layer construction of PET film/pressure-sensitive adhesive layer/PC plate. This sample piece was placed in an oven at 70° C. for 5 hours and subjected to heat resistance test. After the heat resistance test, whether or not the presence of air bubbles or lifting as an appearance defect at the adhesion interface (an interface between the pressure-sensitive adhesive layer and the polycarbonate plate) was visually confirmed. As a result, the evaluated was made such that the case where neither air bubble nor lifting was observed is designated as "○" and that the case where air bubbles or lifting was observed even slightly is designated as "X".

(Measurement Method of Adhesive Strength)

Each of the pressure-sensitive adhesive sheets obtained in Examples 1 to 2 and Comparative Examples 1 to 4 was stuck to a polyethylene terephthalate film (PET film) having a thickness of 25 μm and cut into a prescribed size to prepare a specimen (specimen for adhesive strength measurement) having a width of 20 mm and a length of 120 mm. The specimen was determined with respect to an adhesive strength against a PC plate (polycarbonate plate) and an adhesive strength against a PET film (polyethylene terephthalate film) in the following methods.

Adhesive Strength Against PC Plate:

The foregoing specimen for adhesive strength measurement was stuck onto a polycarbonate plate (PC plate) having a thickness of 2 mm according to JIS Z-0237 in an atmosphere at 23° C. by reciprocating once a roller having a weight of 19.6 N. Thirty minutes thereafter, the sample was peeled away at a peeling rate of 300 mm/min by a tensilon type peeling tester, to measure a peeling adhesive strength in the 180°-direction.

Adhesive Strength Against PET Film:

A polyethylene terephthalate film (PET film) having a thickness of 188 μm was stuck to an acrylic resin-made plate having a thickness of 2 mm via a double-sided pressure-sensitive adhesive sheet to prepare a PET composite plate having a layer construction of PET film/acrylic resin-made plate. The foregoing specimen for adhesive strength measurement was stuck onto the surface of the PET film side of the foregoing PET composite plate according to JIS Z-0237 in an atmosphere at 23° C. by reciprocating once a roller having a weight of 19.6 N. Thirty minutes thereafter, the sample was peeled away at a peeling rate of 300 mm/min by a tensilon type peeling tester, to measure a peeling adhesive strength in the 180°-direction.

(Evaluation Method of Coating Properties)

In preparing each of the pressure-sensitive adhesive sheets obtained in Examples 1 to 2 and Comparative Examples 1 to 4, the pressure-sensitive adhesive solution was cast and coated, and the coated surface was visually observed. As a result, the coating properties were evaluated such that the case where the coated surface became a smooth surface is designated as "○" and that the case where coating stripes were generated on the coated surface, whereby the coated surface did not become a smooth surface is designated as "X".

TABLE 1

|  | Example | | Comparative Example | | | |
| --- | --- | --- | --- | --- | --- | --- |
|  | 1 | 2 | 1 | 2 | 3 | 4 |
| Polymer | | | | | | |
| Kind | A | B | C | B | B | B |
| Weight average molecular weight | 550,000 | 700,000 | 1,200,000 | 700,000 | 700,000 | 700,000 |
| Oligomer | | | | | | |
| Kind | A | B | A | C | D | E |
| Weight average molecular weight | 4,000 | 4,300 | 4,000 | 8,100 | 3,700 | 4,500 |
| Transparency (haze value: %) | 0.5 | 0.5 | 0.6 | 5.8 | 0.6 | 0.7 |
| Lifting and peeling preventing properties | ○ | ○ | X | X | X | X |
| Adhesive strength (N/20 mm) | | | | | | |
| Against PC plate | 9 | 10 | 10 | 9 | 9 | 5 |
| Against PET film | 10 | 11 | 12 | 10 | 9 | 7 |
| Coating properties | ○ | ○ | X | ○ | ○ | ○ |

As is clear from Table 1, the pressure-sensitive adhesive sheets according to Examples 1 to 2 are excellent in lifting and peeling preventing properties. Accordingly, even under conditions where air bubbles are generated from a substrate, they can prevent lifting or peeling due to air bubbles generated from the substrate from occurrence, enable to perform adhering with excellent adhesiveness and are excellent in durability. Moreover, they have excellent transparency.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesive composition comprising (a) an acrylic polymer obtained from a composition comprising an alkyl (meth)acrylate, in which the alkyl group thereof has from 4 to 12 carbon atoms, as a major monomer component and from 1 to 10 parts by weight, based on 100 parts by weight of the whole of the monomer components, of a carboxyl group-containing monomer as a monomer component and having a weight average molecular weight of from 500,000 to 900,000; and (b) an oligomer obtained from a composition comprising an ethylenically unsaturated monomer, in which a homopolymer formed therefrom has a glass transition temperature of from 60 to 190° C. and which has a cyclic structure, as a major monomer component and from 1 to 10 parts by weight, based on 100 parts by weight of the whole of the monomer components, of a carboxyl group-containing monomer as a monomer component and having a weight average molecular weight of from 3,000 to 6,000.

2. The pressure-sensitive adhesive composition according to claim 1, wherein the proportion of the oligomer (b) is from 10 to 35 parts by weight based on 100 parts by weight of the acrylic polymer (a).

3. The pressure-sensitive adhesive composition according to claim 1, wherein the carboxyl group-containing monomer as the monomer component in the acrylic polymer (a) is acrylic acid and the carboxyl group-containing monomer as the monomer component in the oligomer (b) is acrylic acid.

4. The pressure-sensitive adhesive composition according to claim 1, wherein both the acrylic polymer (a) and the oligomer (b) do not contain a nitrogen atom-containing monomer as the monomer component.

5. A pressure-sensitive adhesive product comprising a pressure-sensitive adhesive layer comprising the pressure-sensitive adhesive composition according to claim 1.

* * * * *